United States Patent
Kim

(10) Patent No.: US 7,372,787 B2
(45) Date of Patent: May 13, 2008

(54) OPTICAL DISC RECORDING AND REPRODUCING APPARATUS PERMITTING RECORDING TESTS USING EXTERNAL BUFFER MEMORY AND METHOD OF DRIVING THE APPARATUS

(75) Inventor: Hang-Ro Kim, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 525 days.

(21) Appl. No.: 11/061,028

(22) Filed: Feb. 19, 2005

(65) Prior Publication Data

US 2005/0141383 A1  Jun. 30, 2005

(30) Foreign Application Priority Data

Feb. 19, 2004  (KR)  ............ 10-2004-0011012

(51) Int. Cl.
  *G11B 20/18* (2006.01)
(52) U.S. Cl. .............. 369/44.27; 369/100
(58) Field of Classification Search ........ 369/44.27, 369/47.53, 86, 100
  See application file for complete search history.

(56) References Cited

U.S. PATENT DOCUMENTS 6,201,656 B1 * 3/2001 Go .................. 360/66
6,614,989 B1 * 9/2003 Bruls et al. ........... 386/110
6,646,574 B2 * 11/2003 Maeda et al. ......... 341/58
6,766,291 B2 * 7/2004 Chu et al. ............ 704/215

FOREIGN PATENT DOCUMENTS

| JP | 06-275029 | * 9/1994 |
|----|-----------|----------|
| JP | 4275029 | 9/1994 |
| JP | 7334934 | 12/1995 |
| JP | 2001110132 | 4/2001 |
| JP | 2002093051 | 3/2002 |
| JP | 2002170239 | 6/2002 |
| JP | 2003059047 | 2/2003 |
| KR | 20030057354 | 7/2003 |

* cited by examiner

*Primary Examiner*—Gautam R. Patel
(74) *Attorney, Agent, or Firm*—F. Chau & Associates, LLC

(57) ABSTRACT

An optical disc recording and reproducing apparatus permitting a recording test using an external memory, and a method of driving the apparatus is provided. The optical disc recording and reproducing apparatus reads and bypasses test data to be recorded, which is stored in a buffer memory in a compact disc-digital audio (CD-DA) format or a data format similar to the CD-DA format. The bypassed data is directly converted into serial data by a synchronizer without being encoded, and is then used in a write strategy for a write strategy unit.

21 Claims, 5 Drawing Sheets

OPTICAL DISC RECORDING AND REPRODUCING APPARATUS PERMITTING RECORDING TESTS USING EXTERNAL BUFFER MEMORY AND METHOD OF DRIVING THE APPARATUS

CROSS-REFERENCE TO RELATED APPLICATION

This application claims priority to the Korean Patent Application No. 2004-11012, filed on Feb. 19, 2004, in the Korean Intellectual Property Office, the disclosure of which is incorporated herein in its entirety by reference.

TECHNICAL FIELD

The present invention generally relates to optical disc recording, and more particularly to optical disc reproduction and recording tests.

DISCUSSION OF THE RELATED ART

In general, optical disc reproducing apparatuses, such as CDP (Compact Disc Player), DVDP (Digital Video Disc Player), CD-R (Compact Disc-Recordable), CD-RW (Compact Disc-Rewritable), or DVD-ROM (Digital Video Disc-Read Only Memory), emit a laser beam to a spiral track on a disc, pick up a reflected beam, and read audio or video information contained in the reflected beam. The audio or video information is coded in the form of pits or patterns of marks and spaces on the spiral track of the disc. Among them, CD-R and CD-RW allow a user or a designer to record audio or video information on a disc. Such recordable optical disc recording and reproducing apparatuses are tested before they are put on the market to check whether their recording function can operate normally.

FIG. 1 is a block diagram of a conventional optical disc recording and reproducing apparatus 100. Referring to FIG. 1, the optical disc recording and reproducing apparatus 100 includes a recording unit 110, a buffer memory 120, such as a Synchronous Dynamic Random Access Memory (SDRAM), and a pickup unit 130, which picks up information from an optical disc. The optical disc recording and reproducing apparatus 100 further includes a Radio Frequency (RF) unit (not shown), which converts an RF signal read from the optical disc by the pickup unit 130 into a digital stream, and a Digital Signal Processor (DSP, not shown), which processes the digital stream and generates an audio or video signal.

The recording unit 110 receives data, which is to be recorded, from a host computer through an Advanced Technology Attachment Packet Interface (ATAPI) 111, and stores the data to be recorded in the buffer memory 120 according to an address designated by a memory interface 112. The data stored in the buffer memory 120 is either audio or video information that is to be recorded by a user during a normal recording process. During the normal recording process, the memory interface 112, a first encoder 113, a memory 114, such as a Static Random Access Memory (SRAM), and a second encoder 115 of the recording unit 110 encode the data to be recorded, which is stored in the buffer memory 120, in a predetermined format.

A write strategy unit 117 generates a signal for driving a Laser Diode (LD) of a pickup unit 130 using the encoded data, such that the LD emits a laser beam to a track on a disc and records information coded in the patterns of marks and spaces. When the first encoder 113 encodes the data, a data header, a Error Checking and Correction (ECC) parity, or Error Detecting Code (EDC) parity is added.

During a recording test, a test pattern generator 118 outputs test data that includes predetermined patterns to be used in the test. The test data with the predetermined patterns to be recorded on the disc for the test is stored in the test pattern generator 118. If the test data is outputted, then the second encoder 115 encodes the test data and the write strategy unit 117 generates the signal for driving the LD of the pickup unit 130 using the encoded data. The second encoder 115 encodes the test data so that the test data can be written to the disc according to Disc Timing Information (DTI) generated by an Absolute Time In Pregroove (ATIP) interface 116. When the second encoder 115 encodes the data, data merging or modulation is performed according to predetermined standards.

In a recording test performed using the conventional optical disc recording and reproducing apparatus 100, a write strategy parameter test, an optical power calibration test, or a specific pattern test are performed. The conventional optical disc recording and reproducing apparatus 100 employs a separate circuit, such as the write strategy signal generating unit 117, to perform the recording test, and uses the internal SRAM 114.

Another conventional optical disc recording and reproducing apparatus is disclosed in U.S. Pat. No. 6,611,481. Here, the conventional optical disc recording and reproducing apparatus utilizes a long mark data generator corresponding to the test pattern generator 118 of FIG. 1 to generate test data to be recorded. The test data to be recorded is transformed through a predetermined modulation process, and then, is used in a write strategy. Accordingly, the optical disc recording and reproducing apparatus disclosed in U.S. Pat. No. 6,611,481 is similar to the conventional optical disc recording and reproducing apparatus 100 of FIG. 1.

However, since the conventional optical disc recording and reproducing apparatuses generate test data by using a separate circuit, the test patterns used are relatively simple. The number of test patterns can be increased using test hardware with a more complex configuration, but costs increase in implementing such increased number of test patterns. Thus, implementing a flexible recording test is limited due to the corresponding increase in costs. Further, the number of test patterns can be increased using the internal SRAM 114, but the length of test patterns is restricted by the size of the SRAM 114.

SUMMARY OF THE INVENTION

One aspect of the present invention provides an optical disc recording and reproducing apparatus, which can increase the flexibility of test patterns, ensure sufficiently long test patterns, and conveniently check a recording state by bypassing test data stored in a Static Random Access Memory (SDRAM) buffer, where the test data is stored in a Compact Disc-Digital Audio (CD-DA) format or other data format similar to the CD-DA format. The bypassed data is used in a write strategy without an encoding operation to generate a Laser Diode (LD) driving signal.

Another exemplary embodiment of the present invention provides a technique for driving an optical disc recording and reproducing apparatus, which can increase the flexibility of test patterns, ensure sufficiently long test patterns, and conveniently check a recording state.

According to another aspect of the present invention, there is provided an optical disc recording and reproducing apparatus that includes a recording unit which receives data to be recorded. The data to be recorded is encoded to generate a laser diode driving signal in a first recording mode, and the data to be recorded is bypassed without being encoded to generate a laser diode driving signal in a second recording mode. The apparatus further includes, a pickup unit, which emits a laser beam onto a disc and reads information coded on the disc from a reflected beam during a reproduction process, and responds to the laser driving signal and forms information coded on the disc during a recording process. The optical disc recording and reproducing apparatus can further include a buffer memory, which stores the data to be recorded that is input from a host computer connect through an interface of the recording unit, and outputs the data to be recorded to the recording unit.

In another aspect of the invention, the data to be recorded can be input from the host computer in a compact disc-digital audio format and can be stored in a compact disc-digital audio format in the buffer memory, and the data bypassed by the first encoder can be also in a compact disc-digital audio format. If the data to be recorded is a digital signal with a non-return to zero pulse format when being read in the buffer memory, the serial data can also be a digital signal with a non-return to zero pulse format. Alternately, if the data to be recorded is a pulse signal with a non-return to zero inverted pulse format when being read in the buffer memory, the serial data can also be a digital signal with a non-return to zero inverted pulse format.

According to yet another aspect of the present invention, there is provided a method of driving an optical disc recording and reproducing apparatus that includes, receiving data to be recorded; encoding the data to be recorded to generate a laser diode driving signal in a first recording mode, and bypassing the data to be recorded without an encoding operation to generate a laser diode driving signal in a second recording mode; responding to the laser diode driving signal and forming information coded on a disc by means of a pickup unit during a recording process; and emitting a laser beam onto the disc; and reading the information coded on the disc from a reflected beam by means of the pickup unit during a reproduction process. The method can further include storing data input from a host computer in a buffer memory; and reading the data stored in the buffer memory and outputting the read data as the data to be recorded during the recording process.

BRIEF DESCRIPTION OF THE DRAWINGS

Exemplary embodiments of the present invention are described with reference to the accompanying drawings, of which.

DETAILED DESCRIPTION OF THE INVENTION

The exemplary embodiments of the present invention will be described with reference to the appended drawings.

Figure 2:
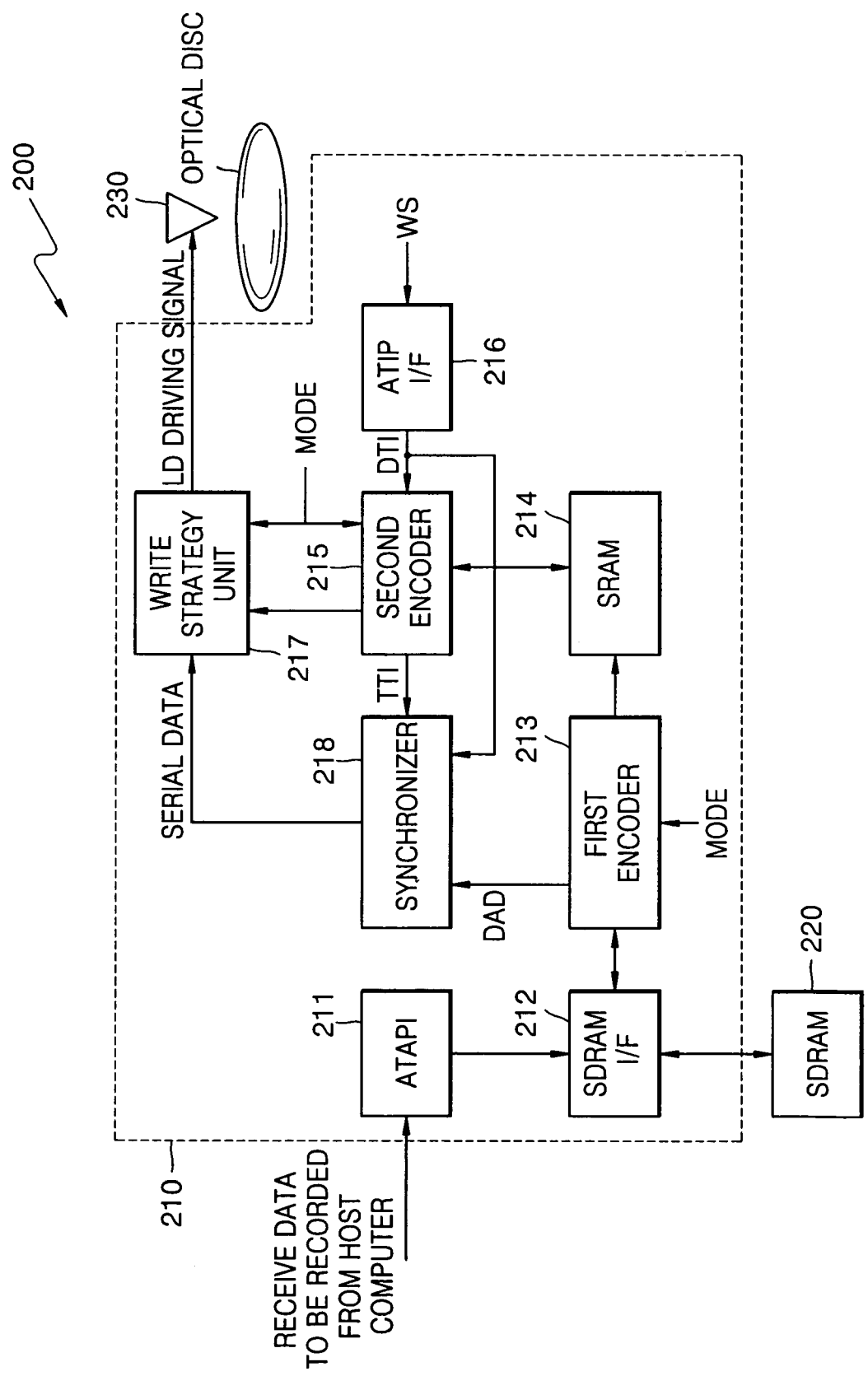
FIG. 2 is a block diagram of an optical disc recording and reproducing apparatus according to an exemplary embodiment of the present invention.

FIG. 2 is a block diagram of an optical disc recording and reproducing apparatus 200 according to an exemplary embodiment of the present invention. Referring to FIG. 2, the optical disc recording and reproducing apparatus 200 includes a recording unit 210, a buffer memory 220, and a pickup unit 230. The optical disc recording and reproducing apparatus 200 is a digital device, for example, a Compact Disc-Recordable (CD-R) or a Compact Disc-Rewritable (CD-RW), which can reproduce information coded on a disc and also can record desired information on the disc.

When a recording process is performed, the recording unit 210 receives data to be recorded and generates a Laser Diode (LD) driving signal according to a predetermined write strategy. The pickup unit 230 responds to the LD driving signal and forms coded patterns of marks and spaces on the disc, where the coded patterns represent the data to be recorded on the disc.

After a reproduction process is performed on the disk, the pickup unit 230 emits a laser beam onto the disc, reads information coded on the disc from a reflected beam, and generates a Radio Frequency (RF) signal. An RF unit (not shown) converts the RF signal into a digital stream. A Digital Signal Processor (DSP; not shown) decodes the digital stream output generated by the RF unit during the reproduction process and converts the decoded digital stream into a signal for driving an audio system or a video system. Accordingly, a user can listen to or see the information coded on the disc through the audio system or the video system. Further, the pickup unit 230 includes a focusing actuator (not shown), which vertically moves under the optical disc so that the laser beam emitted from the LD can be focused on the disc exactly, and a tracking actuator, which horizontally moves in and out with respect to the center of the disc so that the laser beam can track the optical disc exactly.

A recording mode is divided into a normal recording mode and a recording test mode. The normal recording mode or the recording test mode is selected by a mode select signal MODE (See FIG. 2). The normal recording mode is selected when a user records desired information on the disc. The recording test mode is selected when a designer or a manufacturer of the optical disk equipment wants to check whether data are correctly recorded on the disc before products are placed on the market.

The recording test mode can be further used to verify whether circuits in a recording path are stable and whether a given write strategy is correct. In particular, whether the write strategy unit 217 of FIG. 2 optimally generates the LD driving signal is tested in the recording test mode. The write strategy unit 217 determines the power of the LD laser beam so that the LD provided in the pickup unit 230 can properly form marks and spaces on the disc. The operation of the write strategy unit 217 will be further explained with reference to FIG. 5.

The recording unit 210 receives data to be recorded from the buffer memory 220. The buffer memory 220 is disposed outside the recording unit 210. The buffer memory 220 stores the data to be recorded. The buffer memory 220 receives the data input from an external host computer through an interface of the recording unit 210, and outputs the data to be recorded to the recording unit 210 during the recording process. The buffer memory 220 can be a Synchronous Dynamic Random Access Memory (SDRAM).

The recording unit 210 encodes the data to be recorded in the normal recording mode during the recording process to generate the LD driving signal, and bypasses the data to be recorded in the recording test mode during the recording process without encoding the data to generate the LD driving signal.

Referring to FIG. 2, the recording unit 210 includes an Advanced Technology Attachment Packet Interface (ATAPI) 211, a buffer memory interface 212, a first encoder 213, a memory 214, a second encoder 215, an Absolute Time In Pregroove (ATIP) interface 216, the write strategy unit 217, and a synchronizer 218.

A user inputs the data to be recorded to the recording unit 210 through the host computer. The ATAPI 211 is an interface between the host computer and the recording unit 210. The ATAPI 211 outputs the data to be recorded to the buffer memory interface 212. After the buffer memory interface 212 receives the data to be recorded, it accesses the buffer memory 220 and stores the data to be recorded in the buffer memory 220.

During the recording process, the first encoder 213 accesses the buffer memory 220 through the buffer memory interface 212 and reads the data to be recorded. The first encoder 213 performs a first encoding operation in the normal recording mode by adding information containing header, Error Checking and Correction (ECC), and Error Detecting Code (EDC) parity to the frames of the data to be recorded and outputs the first encoded data.

The first encoder 213, however, bypasses and outputs the data to be recorded in the recording test mode. Here, the data to be recorded, particularly, in the recording test mode, is input from the host computer in a Compact Disc-Digital Audio (CD-DA) format or a data format similar to the CD-DA format, and is stored in the buffer memory 220 in a CD-DA format or the like. The bypassed data DAD is also output in a CD-DA format or the like. Here, a CD-DA format is different from a CD-ROM data format in that header, ECC, EDC parity, and the like are not added to data frames. Accordingly, the CD-DA format is a format for user data that includes audio and video information corresponding to the contents to be recorded.

Figure 1:
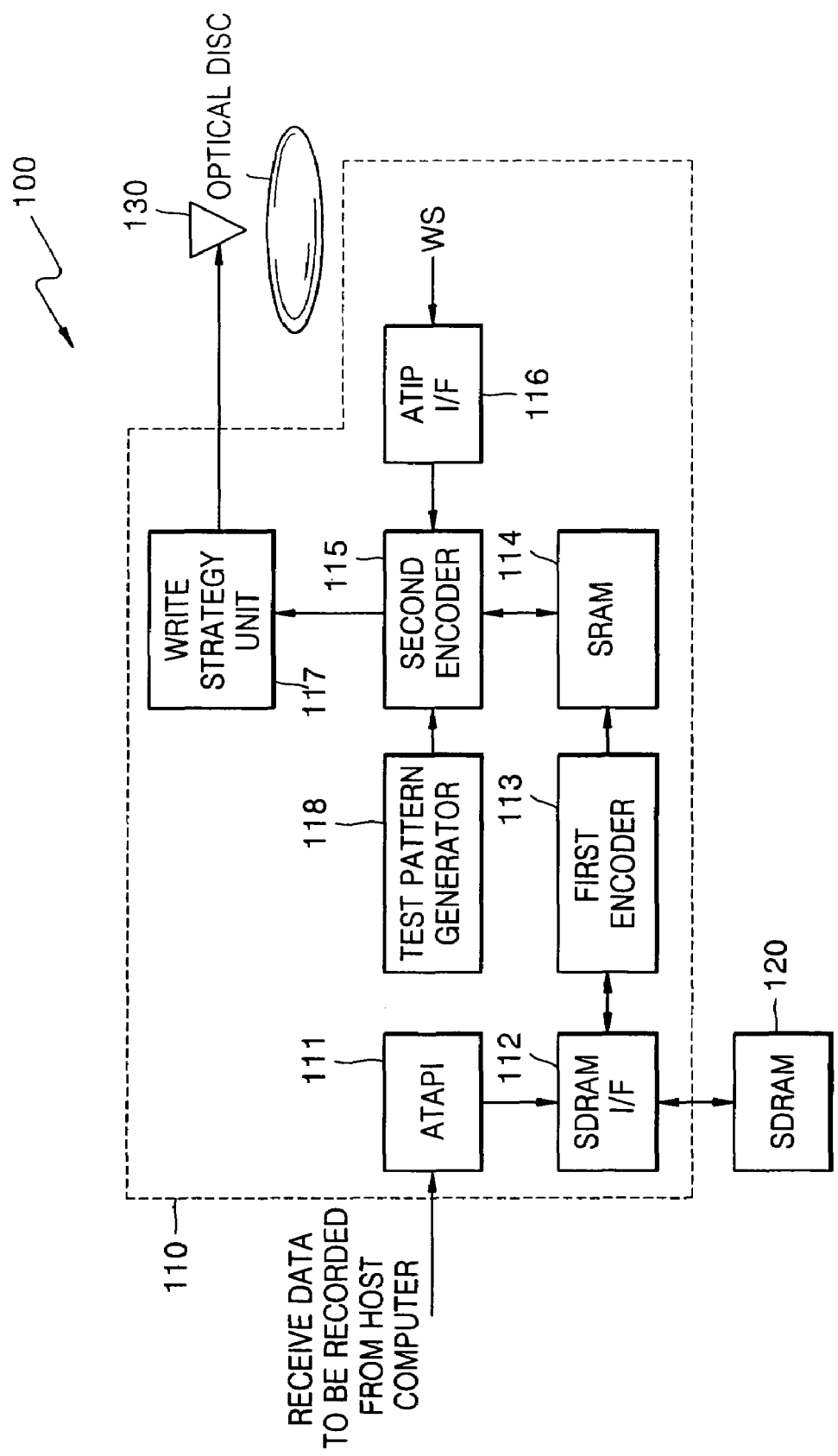
FIG. 1 is a block diagram of a conventional optical disc recording and reproducing apparatus.

In at least one exemplary embodiment of the invention, the bypassed data DAD has the CD-DA format; the bypassed data DAD is not encoded by the first encoder 213 and the second encoder 215; and the write strategy unit 217 drives the LD driving signal according to the bypassed data DAD. To illustrate, in a conventional optical disc recording and reproducing apparatus 100 shown in FIG. 1 or as generally disclosed in U.S. Pat. No. 6,611,481, data to be recorded does not have a CD-DA format, and is used in write strategy after being encoded in a predetermined form. I If the data to be recorded has a CD-DA format and is used in write strategy for the write strategy unit 217 without being encoded, a recording state can be easily checked. The first encoded data is stored in the memory 214. The memory 214 may be a Static Random Access Memory (SRAM). The second encoder 215 accesses the memory 214 and reads the first encoded data; performs a second encoding operation by merging, scrambling or modulating the read data using disc timing information DTI indicating a position on the disc; and outputs the second encoded data.

The disc timing information DTI is generated by the ATIP interface 216. The ATIP interface 216 processes a wobble signal WS indicating a current track position on the disc and generates the disc timing information DTI. ATIP information is formed in a track on the disc, and the disc timing information DTI is generated from the wobble signal WS picked up and processed by the pickup unit 230, so that the current track position represented by minutes, seconds, and frames from the center of a concentric circle can be determined. In general, a one second time interval includes about 75 frames.

The write strategy unit 217 generates the LD driving signal according to the second encoded data in the normal recording mode. The write strategy unit 217 drives the LD driving signal according to serial data of the bypassed data DAD in the recording test mode. The bypassed data DAD is converted into the serial data by the synchronizer 218. The serial data is a digital signal with a Non-Return to Zero (NRZ) pulse format or a Non-Return to Zero Inverted (NRZI) pulse format. The NRZ and NRZI pulse formats are well known. The NRZ pulse format is a digital signal format in which a bit is represented by either a low-to-high or high-to-low state transition, and the NRZI pulse format is a digital signal format in which a pulse width of a high state in an NRZ pulse is represented by using only a clock cycle. Here, if the serial data is a digital signal with an NRZ pulse format, the data to be recorded that is input from the host computer and the data to be recorded that is read by the buffer memory 220 are also digital signals with NRZ pulse formats. Further, if the serial data is a digital signal with an NRZI pulse format, the data to be recorded that is input from the host computer and the data to be recorded that is read by the buffer memory 220 are also digital signals with NRZI pulse formats.

Figure 3:
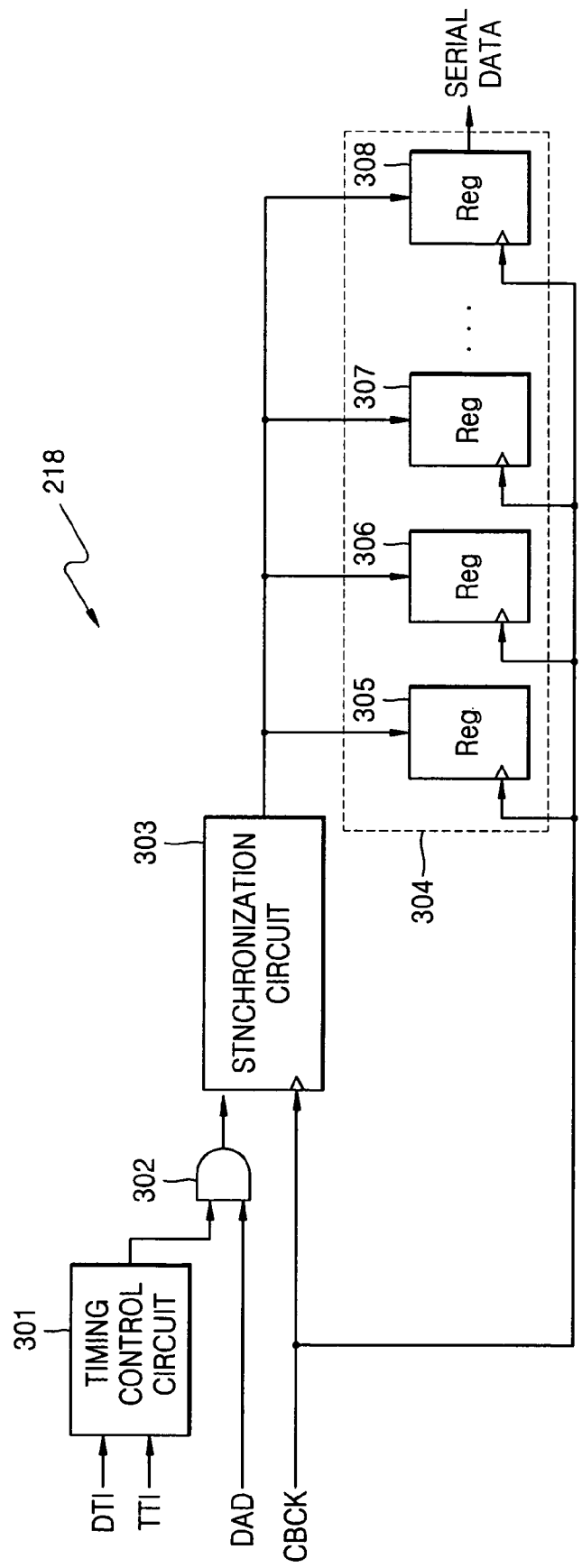
FIG. 3 is a block diagram of a synchronizer of the optical disc recording and reproducing apparatus shown in FIG. 2.

FIG. 3 is a detailed block diagram of the synchronizer 218 of the optical disc recording and reproducing apparatus shown in FIG. 2. Referring to FIG. 3, the synchronizer 218 includes a timing control circuit 301, a logic circuit 302, a synchronization circuit 303, and registers 304.

The timing control circuits 301 compares Target Time Information (TTI) indicating a position to be recorded on the disc with the Disc Timing Information (DTI) input from the ATIP interface 216, and generates a signal indicating times when the recording process starts and ends. The TTI is stored in a memory provided in the second encoder 215, and is output in the recording test mode. As described above, the disc timing information DTI, which is generated by processing the wobble signal WS, determines the current track position represented by minutes, seconds, and frames as determined from the center of the concentric circle. The TTI is formed such that the times when the recording process starts and ends are stored in forms of minutes, seconds, and frames. Accordingly, the timing control circuit 301 combines the TTI with the DTI to generate the signal indicating the times when the recording process starts and ends.

The logic circuit 302 is an "AND" logic circuit, and selectively outputs or does not output the bypassed data DAD according to a logic state of the signal indicating the times when the recording process starts and ends. When the bypassed data DAD is output from the logic circuit 302, the synchronization circuit 303 stores the bypassed data DAD sequentially in bits, e.g., 8 or 16 bits, according to a channel bit clock CBCK, and outputs the stored bypassed data DAD in parallel. The registers 304 receive the bits of the bypassed data DAD in parallel, and output the bits in series according to the channel bit clock CBCK. Logic circuits 305 through 308 constituting the registers 304 are flip-flops, and output one bit every clock cycle according to the channel bit clock CBCK.

The normal recording process and the recording test process of the optical disc recording and reproducing apparatus 200 will be discussed below.

Figure 4:
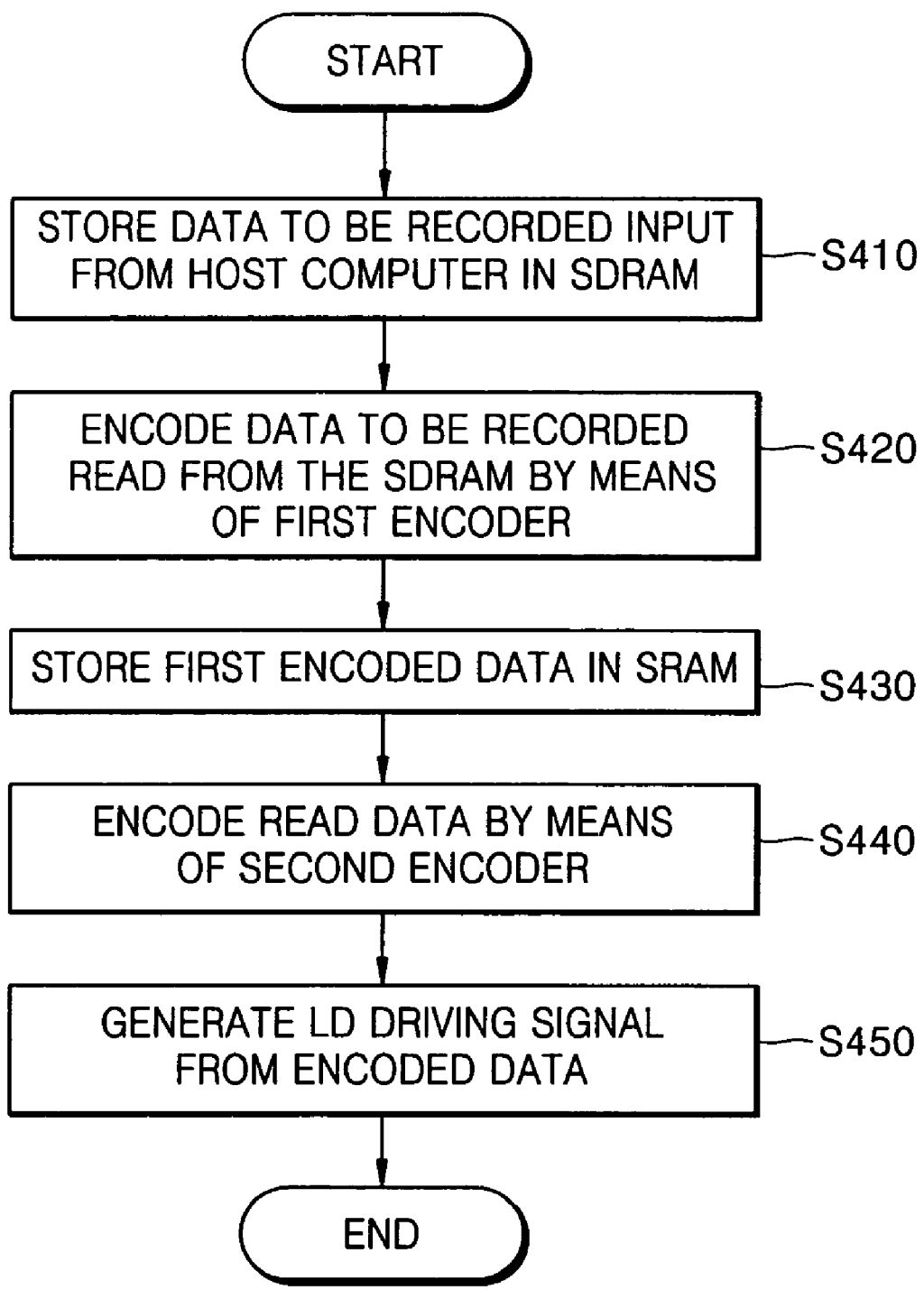
FIG. 4 is a flowchart for a normal recording process of the optical disc recording and reproducing apparatus shown in FIG. 2.

FIG. 4 is a flowchart for the normal recording process of the optical disc recording and reproducing apparatus 200 shown in FIG. 2. Referring to FIG. 4, in the normal recording mode, first, if a user transmits data to be recorded through a host computer, in operation S410, the ATAPI 211 and the buffer memory interface 212 of the recording unit 210 stores the data to be recorded that is input from the host computer in the buffer memory 220. The normal recording mode is used for the user to record wanted information on the disc.

Next, in operation S420, the first encoder 213 accesses the buffer memory 220 through the buffer memory interface 212 to read the data to be recorded. Thereafter, the first encoder 213 performs a first encoding operation by adding information containing header, ECC, or EDC parity to frames of the data to be recorded, and outputs the first encoded data. In operation S430, the first encoded data is stored in the SRAM memory 214.

Next, in operation S440, the second encoder accesses the memory 214 to read the first encoded data, performs a second encoding operation by merging, scrambling or modulating the read data using DTI indicating a position on the disc, and outputs the second encoded data. The DTI is generated in the ATIP interface 216. In operation S450, the write strategy unit 217 generates an LD driving signal according to the second encoded data.

Figure 5:
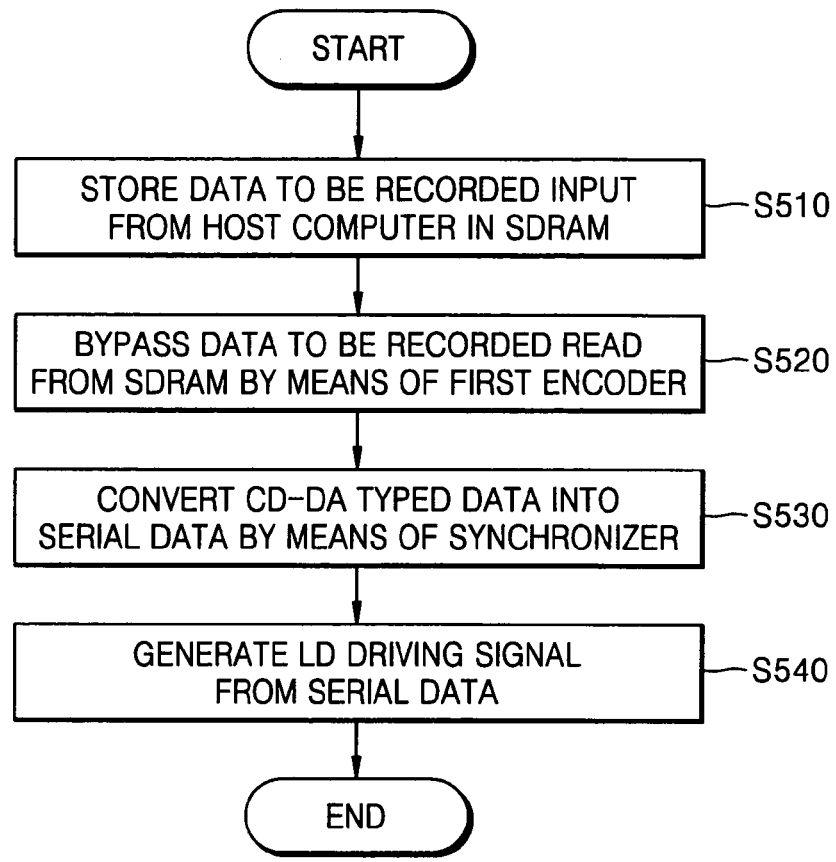
FIG. 5 is a flowchart for a recording test process of the optical disc recording and reproducing apparatus shown in FIG. 2.

FIG. 5 is a flowchart for explaining the recording test process of the optical disc recording and reproducing apparatus 200 shown in FIG. 2. Referring to FIG. 5, if a user transmits test data to be recorded through a host computer in the recording test mode, in operation S510, the ATAPI 211 and the buffer memory interface 212 of the recording unit 210 first store the test data to be recorded that is input from the host computer in the buffer memory 220. The recording test mode is used for a designer or a manufacturer to check whether data to be recorded is correctly recorded on the disc before products are placed on the market.

Next, in operation S520, the first encoder 213 accesses the buffer memory 220 through the buffer memory interface 212 to read the test data to be recorded, and then bypasses and outputs the test data to be recorded without encoding the data through the addition of parity or the like. Here, the test data to be recorded is input from the host computer in a CD-DA format or a data format similar to the CD-DA format and is stored in the buffer memory 220 in a CD-DA format or the like, and the bypassed data DAD is also output in a CD-DA format or the like. Here, a CD-DA format is a format for user data in which header, ECC, EDC parity, and the like are not added to data frames, in contrast to a CD-ROM data format.

Next, in operation S530, the synchronizer 218 converts the bypassed data DAD into serial data. In operation S540, the write strategy unit 217 generates the LD driving signal according to the serial data of the bypassed data DAD in the recording test mode. The serial data is a digital signal with an NRZ or NRZI pulse format. Here, if the serial data is a digital signal with an NRZ pulse format, the data to be recorded that is input from the host computer and the data to be recorded that is read from the buffer memory 220 are digital signals with NRZ pulse formats. Also, if the serial data is a digital signal with an NRZI pulse format, the data to be recorded that is input from the host computer and the data to be recorded that is read from the buffer memory 220 are digital signals with NRZI pulse formats.

The write strategy unit 217 generates the LD driving signal according to the bypassed data DAD of the CD-DA format. If the data to be recorded is in the CD-DA format and is used in write strategy for the write strategy unit 217 without being encoded in a predetermined form, a recording state of the data to be recorded can be easily checked. That is, since the test data to be recorded is written on the disc in the CD-DA format without being encoded, information written on the disc in a CD-DA format can be immediately reproduced and verified without a decoding operation.

The recording test mode tests whether the circuits in a recording path are stable; whether the write strategy is correct; and whether the write strategy unit 217 of FIG. 5 properly generates the LD driving signals. That is, the LD driving signal output from the write strategy unit 217 drives the LD provided in the pickup unit 230, and the LD radiates a laser beam according to the power of the LD driving signal to form marks and spaces on the disc.

Figure 6:
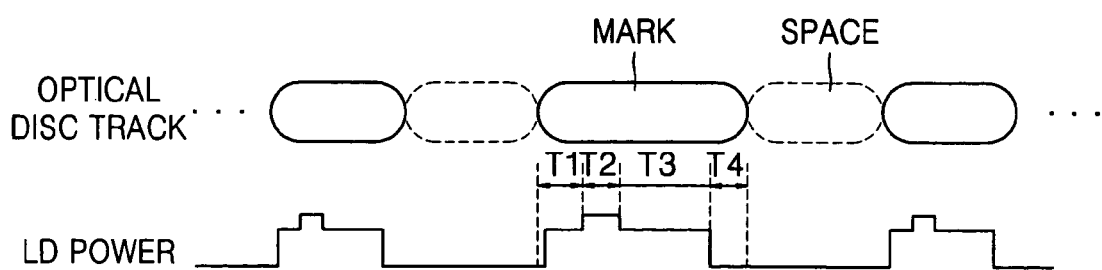
FIG. 6 is a diagram for write strategy parameters in an exemplary embodiment of the invention.

The LD power must be optimally adjusted to record the data on the disc. As shown in FIG. 6, the LD power used for forming the marks and spaces in the current track position during the recording process is affected by the length of current marks and spaces and the length of prior and later marks and spaces. Accordingly, in the recording test mode, there are performed a write strategy parameter test for checking times T1 through T4 of waveforms of the LD driving signal, an optical power calibration test for calibrating the power in each time of the waveforms of the LD driving signal, and a test for checking whether specific patterns are properly recorded.

As discussed above, in the optical disc recording and reproducing apparatus 200, the first encoder 213 reads and bypasses the data to be recorded stored in the buffer memory SDRAM 220 in the CD-DA format or the like. The synchronizer 218 converts the bypassed data DAD into the serial data directly without encoding, and the write strategy unit 217 uses the serial data in the write strategy. Accordingly, test patterns are recorded by the LD driving signal generated by the write strategy unit 217.

As described above, since the optical disc recording and reproducing apparatus according to at least one embodiment of the present invention employs the buffer memory SDRAM, flexible recording test patterns can be made, and sufficiently long test patterns can be ensured. In conventional optical disc recording techniques, since data to be recorded is recorded on a disc after being encoded, a recording state is difficult to be checked. According to the present invention, however, desired test patterns to be recorded are transmitted to the disc without being encoded, thereby easily checking a recording state. Further, since a conventional data path is used without modification, the optical disc recording and reproducing apparatus can be realized at a relatively lower cost.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An optical disc recording apparatus comprising:
   a recording unit which operates to record in a first mode and a second mode, wherein in the first mode, the data to be recorded is encoded to generate a laser diode driving signal, and in the second mode, the data to be recorded is bypassed without being encoded to generate a laser diode driving signal;

a pickup unit, which responds to the laser driving signal and forms information coded on the disc during a recording process; and a buffer memory, which is disposed outside the recording unit, stores the data to be recorded that is input from a host computer through an interface with the recording unit, and outputs the data to be recorded to the recording unit, wherein the recording unit comprises a first encoder, which accesses the buffer memory through the interface, first encodes the data to be recorded to generate first encoded data and outputs the first encoded data in the first mode, and bypasses without encoding and outputs the data to be recorded in the second mode.

2. The optical disc recording apparatus of claim 1, wherein the recording unit additionally comprises:

a memory, which stores the first encoded data;

a second encoder, which accesses the memory to read the first encoded data, and second encodes the first encoded data to generate second encoded data and outputs the read data using disc timing information indicating a position on the disc; and a write strategy unit, which generates the laser diode driving signal according to the second encoded data in the first recording mode, and generates the laser diode driving signal according to serial data of the bypassed data in the second recording mode.

3. The optical disc recording apparatus of claim 2, wherein in the second recording mode, the data to be recorded is input from the host computer in a compact disc-digital audio format and is stored in a compact disc-digital audio format in the buffer memory, and the data bypassed by the first encoder is also in a compact disc-digital audio format.

4. The optical disc recording apparatus of claim 3, wherein the data to be recorded is a digital signal with a non-return to zero pulse format when being read in the buffer memory, and the serial data is also a digital signal with a non-return to zero pulse format.

5. The optical disc recording apparatus of claim 3, wherein the data to be recorded is a pulse signal in a non-return to zero inverted pulse format when being read in the buffer memory, and the serial data is also a digital signal in a non-return to zero inverted pulse format.

6. The optical disc recording apparatus of claim 2, wherein the recording unit further comprises a synchronizer, which converts the bypassed data to the serial data.

7. The optical disc recording apparatus of claim 6, wherein the synchronizer comprises:

a timing control circuit, which compares target time information indicating a position to be recorded on the disc with the disc timing information, and generates a signal indicating times when the recording process starts and ends;

a logic circuit, which selectively outputs or does not output the bypassed data according to a logic state of the signal indicating the times when the recording process start and ends;

a synchronization circuit, which stores the bypassed data sequentially in bits when the bypassed data is output from the logic circuit, and outputs the stored data in parallel; and registers, which receive the bits of the bypassed data in parallel and output the bits in series.

8. The optical disc recording apparatus of claim 7, wherein the target time information is stored in the second encoder, and is output in the second recording mode.

9. The optical disc recording apparatus of claim 2, wherein the first encoding operation is performed by adding information containing a header, a error checking and correction, and a error detecting code parity to frames of the data to be recorded, and the second encoding operation is performed by converting the read data into data according to predetermined standards.

10. The optical disc recording apparatus of claim 1, wherein the pickup unit emits a laser beam onto a disc and reads information coded on the disc from a reflected beam during a reproduction process.

11. A method of driving an optical disc recording apparatus comprising:

receiving data to be recorded;

encoding the data to be recorded to generate a laser diode driving signal in a first recording mode, and bypassing the data to be recorded without an encoding operation to generate a laser diode driving signal in a second recording mode;

responding to the laser diode driving signal and forming information coded on a disc by means of a pickup unit during a recording process; and storing the data to be recorded that is input from a host computer through an interface with a recording unit in a buffer memory, which is disposed outside the recording unit, and outputting the data to be recorded to the recording unit, wherein the recording unit comprises a first encoder, which accesses the buffer memory through the interface, first encodes the data to be recorded to generate first encoded data and outputs the first encoded data in the first recording mode, and bypasses without encoding and outputs the data to be recorded in the second recording mode.

12. The method of claim 11, further comprising:

emitting a laser beam onto the disc and reading the information coded on the disc from a reflected beam by means of the pickup unit during a reproduction process.

13. The method of claim 11, further comprising:

reading the data stored in the buffer memory and outputting the read data as the data to be recorded during the recording process.

14. The method of claim 13, wherein the laser diode driving signal generating operation in the first recording mode comprises:

first encoding the data to be recorded; storing the first encoded data in a predetermined memory;

accessing the predetermined memory to read the first encoded data, and second encoding the read data using disc timing information indicating a position on a disc; and generating the laser diode driving signal according to the second encoded data, and the laser diode driving signal generating operation in the second recording mode comprises:

bypassing and outputting the data to be recorded without the first and second encoding operations; and generating the laser diode driving signal according to serial data of the bypassed data.

15. The method of claim 14, wherein in the second recording mode, the data to be recorded is input in a compact disc-digital audio format from the host computer and is stored in a compact disc-digital audio format in the buffer memory, and the bypassed data is also in a compact disc-digital audio format.

16. The method of claim 15, wherein the data to be recorded is a digital signal with a non-return to zero pulse format when being read in the buffer memory, and the serial data is also a digital signal with a non-return to zero pulse format.

17. The method of claim 15, wherein the data to be recorded is a digital signal with a non-return to zero inverted pulse format when being read in the buffer memory, and the serial data is also a digital signal with a non-return to zero inverted pulse format.

18. The method of claim 14, wherein the laser diode driving signal generating operation in the second recording mode further comprises: converting the bypassed data into the serial data.

19. The method of claim 18, wherein the bypassed data to serial data converting operation comprises:

comparing target time information indicating a position to be recorded on the disc with the disc timing information, and generating a signal indicating times when the recording process starts and ends;

selectively outputting the bypassed data or not outputting the bypassed data according to a logic state of the signal indicating the times when the recording process starts and ends;

sequentially storing the bypassed data in bits when the bypassed data is output, and outputting the stored data in parallel; and receiving the bits of the bypassed data in parallel and outputting the received data in series.

20. The method of claim 19, wherein the target time information is stored in a predetermined memory, and is outputted in the second mode.

21. The method of claim 14, wherein the first encoding operation is performed by adding a header, a error checking and correction, and a error detecting code parity to frames of the data to be recorded, and the second encoding operation is performed by converting the read data into data according to predetermined standards.

* * * * *